(12) United States Patent
Khuc

(10) Patent No.: US 6,470,008 B1
(45) Date of Patent: Oct. 22, 2002

(54) INTERNET ROUTING SYSTEM

(75) Inventor: Minh Duy Khuc, Overland Park, KS (US)

(73) Assignee: Sprint Communications Company L.P., Kansas City, MO (US)

( * ) Notice: Subject to any disclaimer, the term of this patent is extended or adjusted under 35 U.S.C. 154(b) by 0 days.

(21) Appl. No.: 09/112,566

(22) Filed: Jul. 9, 1998

(51) Int. Cl.[7] .............................................. H04L 12/66
(52) U.S. Cl. ....................................... 370/352; 370/401
(58) Field of Search .................... 370/352, 353, 370/354, 355, 356, 401, 402, 403, 404, 405, 410; 379/88.17, 93.01, 93.09, 219, 220

(56) References Cited

U.S. PATENT DOCUMENTS

| | | | | |
|---|---|---|---|---|
| 5,351,237 A | * | 9/1994 | Shinohara et al. | 370/392 |
| 5,970,126 A | * | 10/1999 | Bowater et al. | 379/114 |
| 5,996,021 A | * | 11/1999 | Civanlar et al. | 709/238 |
| 6,052,445 A | * | 4/2000 | Bashoura et al. | 379/100.14 |
| 6,069,890 A | * | 5/2000 | White et al. | 370/352 |
| 6,078,583 A | * | 6/2000 | Takahara et al. | 370/356 |
| 6,236,653 B1 | * | 5/2001 | Dalton et al. | 370/352 |

* cited by examiner

*Primary Examiner*—Kwang B. Yao
(74) *Attorney, Agent, or Firm*—Harley R. Ball; Steven J. Funk; Kevin D. Robb

(57) ABSTRACT

A routing system provides internet service providers with internet routing support for internet communications. The routing system receives a query from an internet service provider and responds with the appropriate internet address to transport communications over the internet. The internet address may direct the communications to an internet gateway or to the routing system itself. The routing system can forward the communications to a destination over the public telephone system. The routing system may process a telephone number to identify the proper internet address for the communication. The routing system may also provide internet gateways for use by the service providers.

11 Claims, 5 Drawing Sheets

| DESTINATION # | CALLER # | TOD | % | IP ADDRESS | IP ADDRESS |
|---|---|---|---|---|---|
| 1 | * | 8-5 | * | X | Z |
| 1 | * | 5-1 | * | Y | Z |
| 1 | * | 1-8 | * | Z | X |
| 2 | A | * | 50 | X | Y |
| 2 | A | * | 50 | Y | X |
| 2 | B | * | * | Z | Y |

*FIG. 5*

INTERNET ROUTING SYSTEM

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of internet routing systems, and in particular, to a system that provides routing information to internet gateways.

2. Statement of the Problem

The internet is a well-known communications system that routes packets based on internet addresses. In a typical internet communication, a user exchanges internet packets with an internet gateway over a local telephone line or local area network. The internet gateway transfers the packets to the internet where internet routers forward the packets based on the internet address. The packets matriculate through a series of routers until they reach a destination server or another internet gateway.

The internet is supplanting conventional long distance telephone lines to create new services for modem, voice, facsimile, and video communications. For example, an internet facsimile service could deploy internet gateways in London and New York. A London customer transmits the facsimile to the London internet gateway using a local telephone call. The London internet gateway transfers internet packets that contain the facsimile over the internet. The packets are addressed to the New York internet gateway. The New York internet gateway receives the internet packets and places a local telephone call in New York. The facsimile is reconstructed in the New York gateway from the packets and transmitted to the destination over the New York telephone line. Using this new service, the customer avoids the cost of an international telephone call between London and New York.

The above-described service can be extended to other types of communications where the internet can provide the transport between networks. Unfortunately, it may not be feasible for the service provider to deploy internet gateways in all desired geographic regions. The service provider must then turn away business where an internet gateway is not available. In the above example, the service provider could handle facsimile communications between London and New York, but could not handle facsimile communications between London and Tokyo.

The service provider may also lack the processing capacity to handle telephone numbers. The ability to process a large database of telephone numbers is a complex and expensive. For example, a new area code causes massive changes to the processing logic in the public telephone system. Even the task of determining if the service provider has the internet gateways to handle the call can be complex as the number of internet gateways increases in a changing telephone numbering environment.

Telephone number processing has evolved into a complex system that handles enhanced service calls. One example is the "800" type call where call routing is dynamically programmable. It will not be economically feasible for many smaller internet service providers to manage and deploy such enhanced service logic.

At present, internet services would be improved by systems and methods for providing internet gateways and internet routing support. Routing support could include telephone number processing and internet address selection.

SUMMARY OF THE SOLUTION

The invention solves the above problem by providing routing support to internet gateways operated by internet service providers that market internet communications services. The invention includes a routing system that receives a query from an internet service provider and responds with the appropriate internet address to transport communications over the internet. The internet address may direct the communications to an internet gateway or to the routing system itself. The routing system can forward the communications to a destination over the public telephone system.

The invention allows service providers to initially offer a robust internet-based telephone service without deploying all of the requisite equipment and software. If the service provider is routing telephone calls over the internet, the service provider does not need to perform the complex data processing required to analyze telephone numbers. The service provider simply queries the routing system over the internet. The routing system processes the telephone number to identify the proper internet address for the communication. The routing system then responds to the service provider with the internet address. Likewise, the service provider does not need internet gateways in all service regions. The routing system or other service providers may provide internet gateways in some regions. The routing system can select internet addresses based upon the availability of internet gateways provided by the routing system or by other service providers.

DESCRIPTION OF THE DRAWINGS

FIG. 5 illustrates routing system logic in an example of the invention.

DETAILED DESCRIPTION OF THE INVENTION

Figure 1:
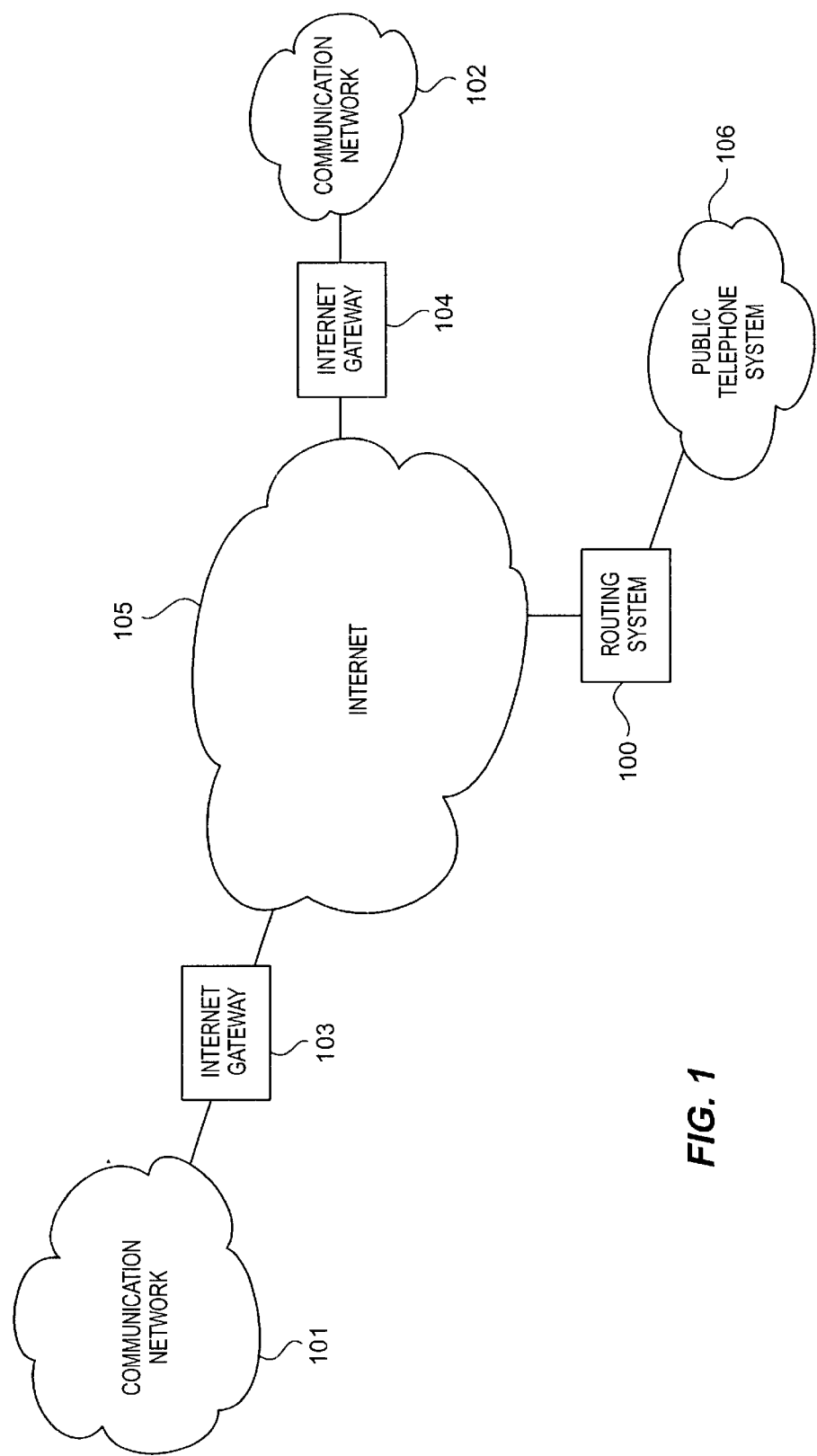
FIG. 1 illustrates system configuration in an example of the invention.
Figure 2:
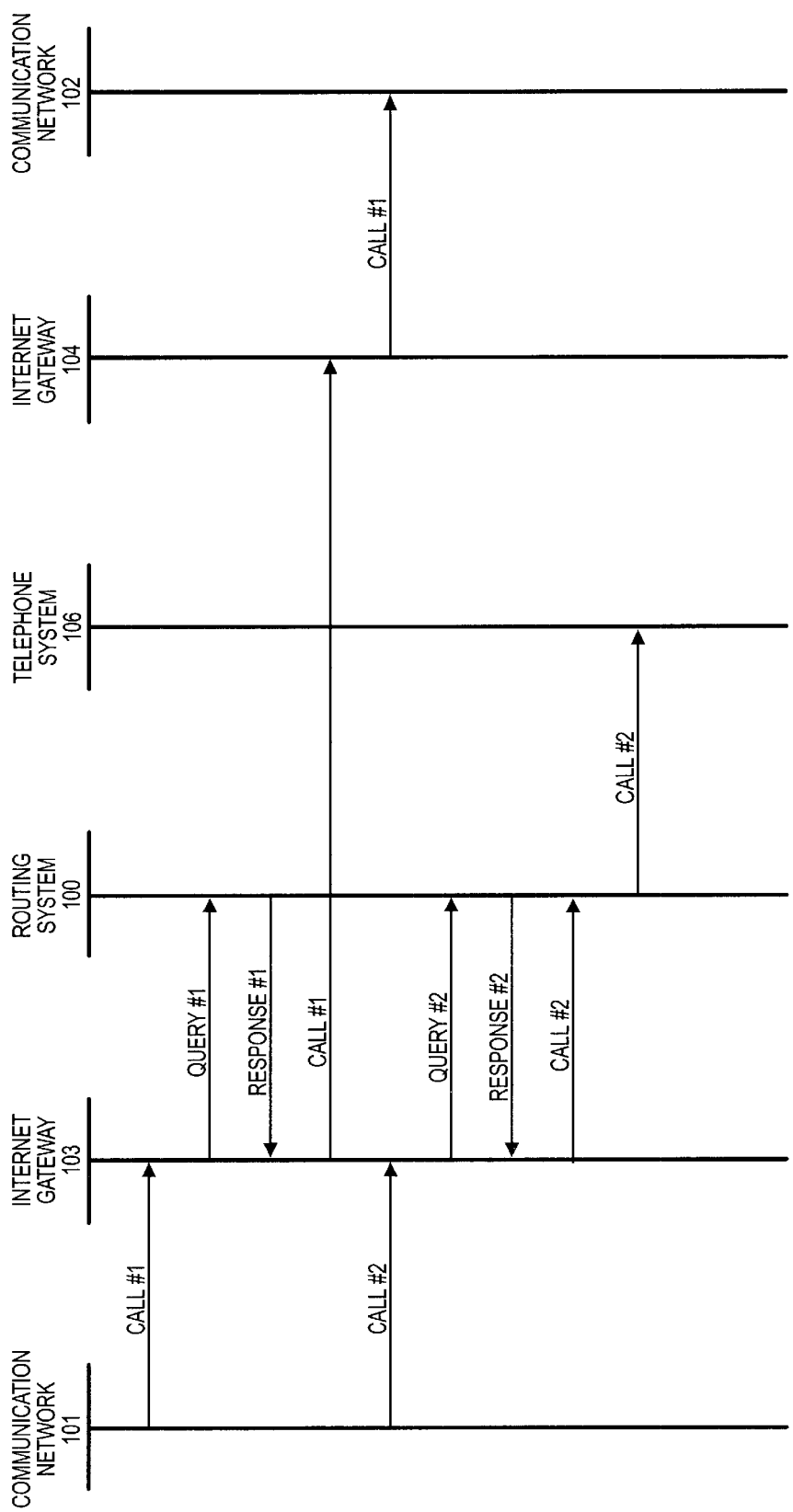
FIG. 2 illustrates system operation in an example of the invention.

System Configuration and Operation—FIGS. 1–2

FIG. 1 depicts the system configuration for some examples of the invention. FIG. 1 shows a routing system 100, communications networks 101 and 102, internet gateways 103 and 104, internet 105, and public telephone system 106. The communications network 101 is connected to the internet gateway 103. The communications network 102 is connected to the internet gateway 104. The public telephone system 106 is connected to the routing system 100. The internet 105 is connected to the routing system 100 and internet gateways 103 and 104. These connections can be conventional and will be readily understood by those skilled in the art within the context of the present invention.

The communications networks 101 and 102 transfer communications to the internet gateways 103 and 104. Some examples of the communications networks 101 and 102 are telephone systems, local area networks, call centers, and intranets. In one example, the communications network 101 is a local telephone network that transfers telephone calls to the internet gateway 103.

The internet gateways 103 and 104 exchange communications between the internet 105 and the communications networks 101 and 102. The internet gateways 103 and 104 generate and transmit queries to the routing system 100 in response to receiving communications from the communications networks 101 and 102. The internet gateways 103 and 104 receive responses to the queries identifying internet address for the communications, and transfer the communications over the internet 105 using the identified internet addresses. The internet gateways 103 and 104 could be conventional internet routers with an interface to the communications networks 101 and 102. One example of an internet access device that could be adapted to support the invention is the TOTAL CONTROL System supplied by 3Com of Santa Clara, Calif.

The internet 105 is a publicly-accessible network that routes packets of user communications based on internet addresses in the packets. The internet 105 could be the well-known "Internet" that is based on the internet protocol. The invention is not restricted to the current version of the internet and may be applicable to new versions and variations of the current internet implementation.

The public telephone system 106 routes conventional telephone calls. Some examples of the public telephone system 106 are local telephone networks, long distance telephone networks, national telephone networks, and international telephone networks.

The routing system 100 provides internet addresses in response to queries from the internet gateways 103 and 104. The routing system 100 could be a conventional router and server system configured with software to operate in accord with the present invention. The software will be apparent to those skilled in the art in the context of the following discussion. The routing system 100 receives queries that request an internet address. In some examples of the invention, the queries include telephone numbers. The routing system 100 processes the queries to select internet addresses. For example, the routing processor 100 could process an area code in a destination telephone number to select the internet address of the internet gateway serving that area. The routing system 100 transmits responses that contain the selected internet addresses to the internet gateways 103 and 104.

The routing system 100 may also provide an internet gateway function. The routing system 100 could receive internet packets from the internet 105 and transfer the user communications from the packets over the public telephone system 106. The routing system 100 could receive user communications from the public telephone system 106 and transfer packets with the communications over internet 105.

FIG. 2 illustrates system operation for some examples of the invention and is viewed chronologically from top to bottom. The communications network 101 transfers communications in a first telephone call to the internet gateway 103. The internet gateway 103 receives the first telephone call, and in response, sends a first query over the internet 105 to the routing system 100. The first query includes information associated with the first telephone call. In some embodiments, the information includes a telephone number collected from the caller, and may also include the caller's number, caller codes, or the identity of the service provider.

The routing system 100 processes the first query to identify an internet address for the communications. In some embodiments, processing entails analysis of a telephone number. The routing system 100 sends a first response over the internet 105 to the internet gateway 103. The first response identifies the internet address selected by the routing system 100. The internet gateway 103 transfers the communications from the first telephone call over the internet using the internet address. On the first call, the internet address identifies the internet gateway 104. The internet gateway 103 transfers the communications from the first telephone call over the internet to the internet gateway 104. The internet gateway 104 transfers the communications from the internet packets to the communications network 102. The communications network 102 typically serves a device associated with the telephone number collected from the caller.

A second call is shown with a second query and second response. For the second call, the internet address selected by the routing system 100 is for the routing system 100 itself. The internet gateway 103 transfers the communications from the second telephone call over the internet to the routing system 100. The routing system 100 transfers the communications from the internet packets to the public telephone system 106. The public telephone system 106 typically serves a device associated with the telephone number collected from the caller.

Figure 3:
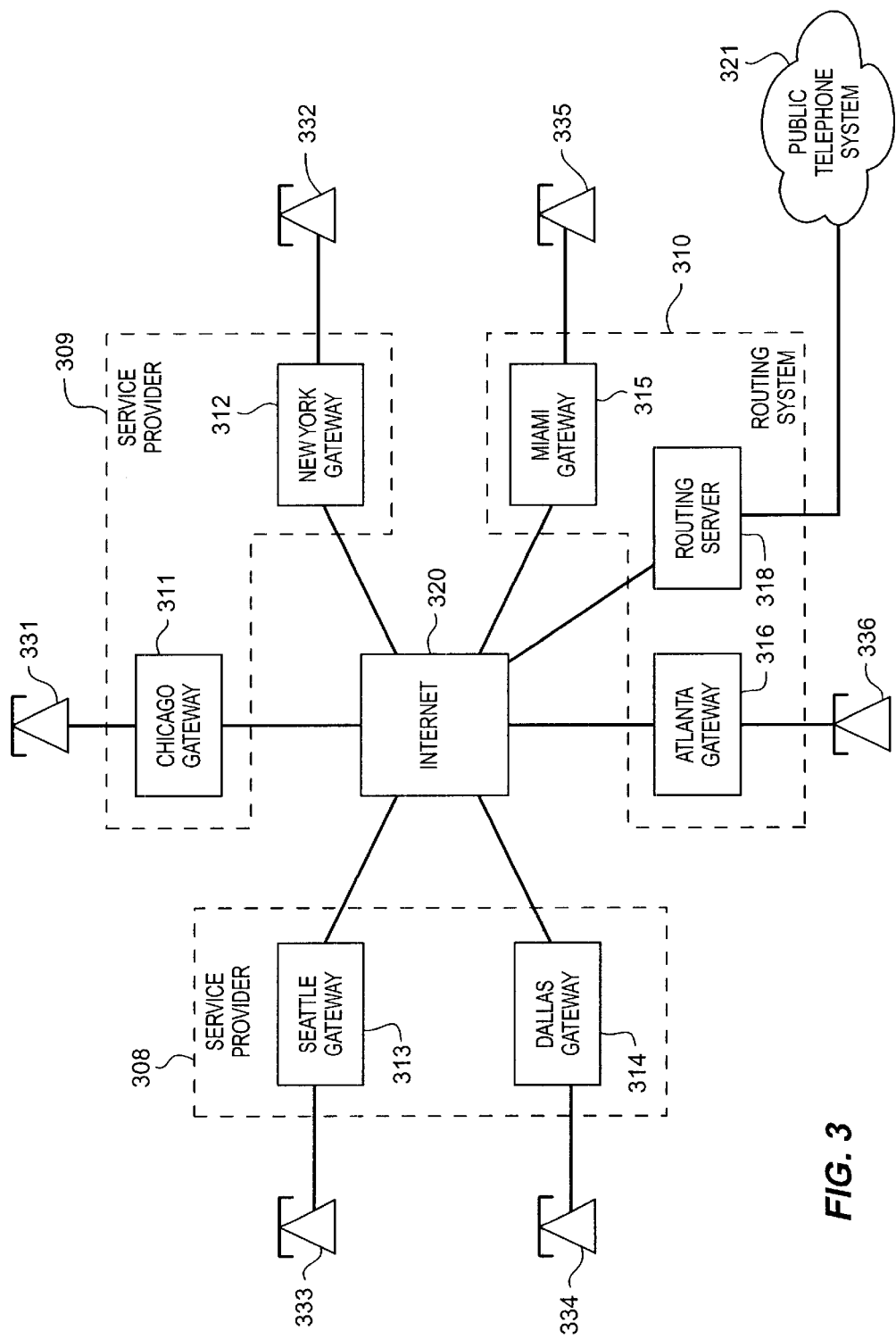
FIG. 3 illustrates routing system configuration and operation in an example of the invention.

Routing System—FIG. 3

FIG. 3 depicts routing system configuration and operation in a detailed example of the invention, but the invention is not restricted to this particular example. Those skilled in the art will appreciate numerous variations in routing system configuration and operation that are within the scope of the invention. Those skilled in the art will also appreciate how the principles illustrated in this example can be used in other examples of the invention.

FIG. 3 depicts service providers 308 and 309, routing system 310, internet 320, public telephone system 321, and telephones 331–336. The service provider 308 includes a Seattle internet gateway 313 and a Dallas internet gateway 314. The service provider 309 includes a Chicago internet gateway 311 and a New York internet gateway 312. The routing system is comprised of a Miami internet gateway 315, an Atlanta internet gateway 316, and a routing server 318. The routing server 318 is connected to the internet 320. The internet gateways 311–316 are connected to the internet 320. The internet gateways 311–316 are respectively connected to the telephones 331–336.

The telephones 331–336 represent any device that includes telephone functionality, such as modems, facsimile machines, computers, wireless devices, and video devices. The telephones 331–336 are typically connected to the internet gateways 311–316 over local telephone networks, intranets, or local area networks. For example, the telephone 333 could be connected to the Seattle internet gateway 313 through a PBX or class 5 switch, and the telephone 332 could be connected to the New York internet gateway 312 over an ethernet system.

The service providers 308 and 309 are entities that provide internet-based services to the telephones 331–336. Some examples of services are facsimile calls, modem calls, voice calls, and video calls. The internet 320 and the internet gateways 311–316 are similar to the internet and internet gateways discussed above for FIGS. 1–2.

The routing server 318 receives queries over the internet 320 from the internet gateways 311–316. The routing server 318 processes the queries to select internet addresses for the calls. The routing server 318 responds to the internet gateways 311–316 with the selected internet addresses. The routing server 318 can exchange calls with the public telephone system 321, especially when another gateway is not available to originate or terminate the call. The routing server 318 could be a conventional internet server/database system configured with software to operate in accord with the following description.

Several sample calls are discussed below to illustrate this example of the invention. The first sample call is placed between the telephones 333 and 334. The telephone 333 places the call to the Seattle internet gateway 313 over the local telephone network in Seattle. The Seattle internet gateway 313 of the service provider 308 answers the call and collects the destination telephone number for the call. The Seattle internet gateway 313 generates a query that is addressed to the routing server 318 and that contains the destination telephone number. The Seattle internet gateway 313 transfers the query to the internet 320. The routing server 318 receives the query and processes the destination telephone number to select an internet address. Since the telephone 334 is in the Dallas area, the internet address for the Dallas internet gateway 314 is selected. The routing server 318 responds to the Seattle internet gateway 313 with the selected internet address. The Seattle internet gateway 313 receives communications from the telephone 333. The Seattle internet gateway 313 transfers internet packets addressed to the Dallas internet gateway 314 to the internet 320. The internet packets contain the communications and the destination telephone number. The Dallas internet gateway 314 receives the packets from the internet 320. The Dallas internet gateway 314 places a local telephone call to the telephone 334 using the destination telephone number and transmits the communications from the packets over the call. Reciprocal communications could flow from the Dallas internet gateway 314 to the Seattle internet gateway 313 in a similar manner.

The second sample call is placed between the telephones 333 and 332. The telephone 333 places the call to the Seattle internet gateway 313 over the local telephone network in Seattle. The Seattle internet gateway 313 of the service provider 308 answers the call and collects the destination telephone number for the call. The Seattle internet gateway 313 generates a query that is addressed to the routing server 318 and that contains the destination telephone number. The Seattle internet gateway 313 transfers the query to the internet 320. The routing server 318 receives the query and processes the destination telephone number to select an internet address. The telephone 334 is in the New York area and the service provider 308 does not have a New York internet gateway. The routing server 318 selects the internet address for the New York internet gateway 312 of the service provider 309. The routing server 318 responds to the Seattle internet gateway 313 with the selected internet address. The Seattle internet gateway 313 receives communications from the telephone 333. The Seattle internet gateway 313 transfers internet packets addressed to the New York internet gateway 312 to the internet 320. The internet packets contain the communications and the destination telephone number. The New York internet gateway 312 receives the packets from the internet 320. The New York internet gateway 312 places a local telephone call to the telephone 332 using the destination telephone number and transmits the communications from the packets over the call. Reciprocal communications could flow from the New York internet gateway 312 to the Seattle internet gateway 313 in a similar manner.

The third sample call is placed between the telephones 333 and 335. The telephone 333 places the call to the Seattle internet gateway 313 over the local telephone network in Seattle. The Seattle internet gateway 313 of the service provider 308 answers the call and collects the destination telephone number for the call. The Seattle internet gateway 313 generates a query that is addressed to the routing server 318 and that contains the destination telephone number. The Seattle internet gateway 313 transfers the query to the internet 320. The routing server 318 receives the query and processes the destination telephone number to select an internet address. The telephone 334 is in the Miami area and the service provider 308 does not have a Miami internet gateway. The routing server 318 selects the internet address for the Miami internet gateway 315 of the routing system 310. The routing server 318 responds to the Seattle internet gateway 313 with the selected internet address. The Seattle internet gateway 313 receives communications from the telephone 333. The Seattle internet gateway 313 transfers internet packets addressed to the Miami internet gateway 315 to the internet 320. The internet packets contain the communications and the destination telephone number. The Miami internet gateway 315 receives the packets from the internet 320. The Miami internet gateway 315 places a local telephone call to the telephone 335 using the destination telephone number and transmits the communications from the packets over the call. Reciprocal communications could flow from the Miami internet gateway 315 to the Seattle internet gateway 313 in a similar manner.

The fourth sample call is placed between the telephones 335 and 336. The telephone 335 places the call to the Miami internet gateway 315 over the local telephone network in Miami. The Miami internet gateway 315 of the routing system 310 answers the call and collects the destination telephone number for the call. The Miami internet gateway 315 generates a query that is addressed to the routing server 318 and that contains the destination telephone number. The Miami internet gateway 315 transfers the query to the internet 320. The routing server 318 receives the query and processes the destination telephone number to select an internet address. The telephone 334 is in the Atlanta area, so the routing server 318 selects the internet address for the Atlanta internet gateway 316 of the routing system 310. The routing server 318 responds to the Miami internet gateway 315 with the selected internet address. The Miami internet gateway 315 receives communications from the telephone 335. The Miami internet gateway 315 transfers internet packets addressed to the Atlanta internet gateway 316 to the internet 320. The internet packets contain the communications and the destination telephone number. The Atlanta internet gateway 316 receives the packets from the internet 320. The Atlanta internet gateway 316 places a local telephone call to the telephone 336 using the destination telephone number and transmits the communications from the packets over the call. Reciprocal communications could flow from the Atlanta internet gateway 316 to the Miami internet gateway 315 in a similar manner.

It should be appreciated from the above examples that the service provider does not need to build and maintain a large data processing system for telephone numbers. The routing system processes the telephone numbers to select the appropriate internet address for the service provider. Such processing could entail many factors, such as the identity of the service provider, the location of various internet gateways, the caller's number, the time of day, and access codes to name a few examples. If desired, the service provider can program an internet gateway with a simple list of telephone number—internet address assignments and off-load the remaining data processing to the routing server. The routing system can also provide quality of service by re-routing calls based on real-time traffic management. The routing system can initiate the re-route in mid-call.

It should be appreciated from the above examples that a service provider does not need to deploy internet gateways in every region. The routing system or other service providers can provide internet gateways to handle communications that a particular service provider cannot handle. The selection of internet addresses could be based on the internet gateways available near the destination region identified by the telephone number collected from the caller. In the above example, the routing system provided internet gateways in Miami and Atlanta for use by the other service providers.

Figure 4:
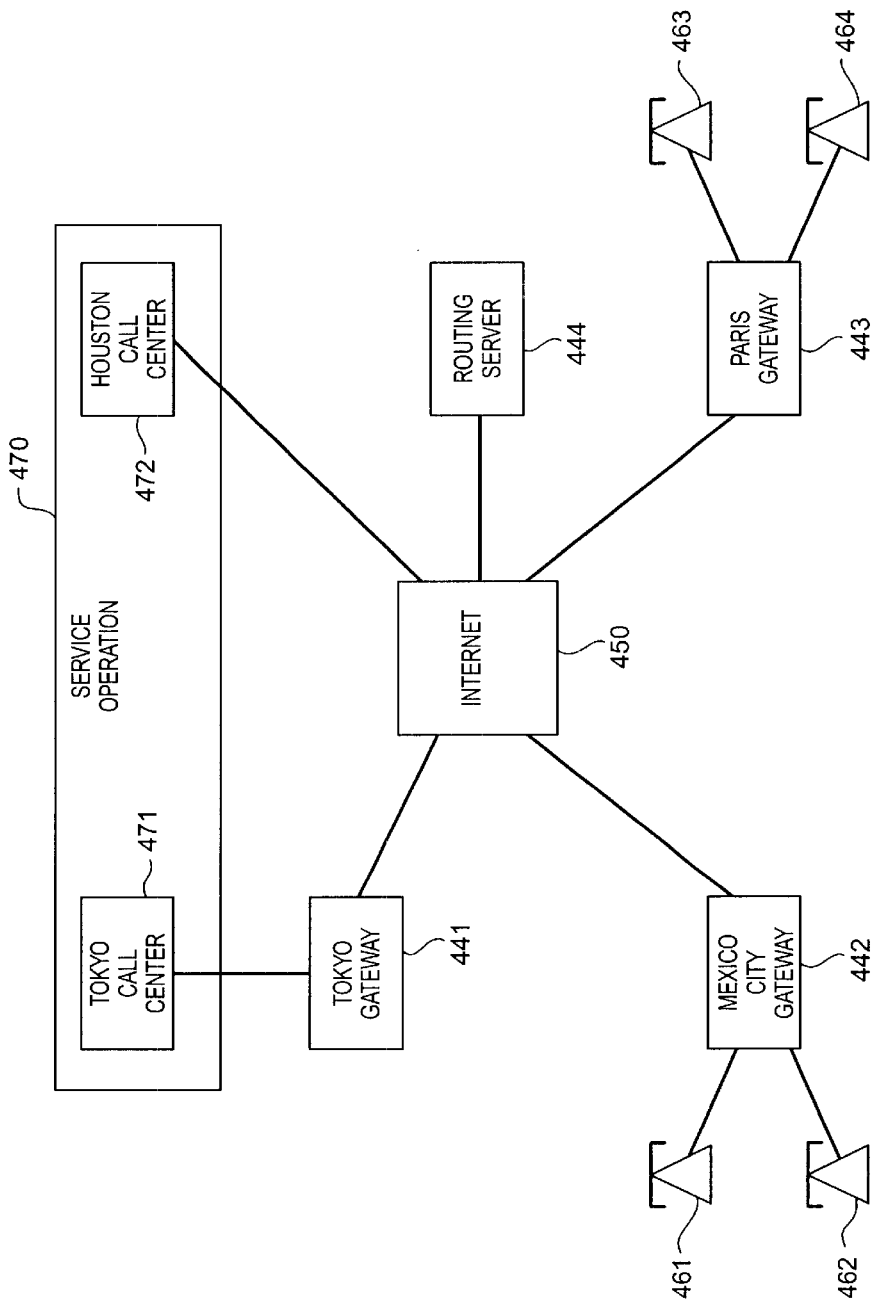
FIG. 4 illustrates enhanced routing system configuration and operation in an example of the invention.

Enhanced Routing System—FIGS. 4–5

FIGS. 4–5 depict enhanced routing system configuration and operation in a detailed example of the invention, but the invention is not restricted to this particular example. Those skilled in the art will appreciate numerous variations in system configuration and operation that are within the scope of the invention. Those skilled in the art will also appreciate how the principles illustrated in this example can be used in other examples of the invention.

FIG. 4 depicts an internet 450 connected to Tokyo internet gateway 441, Mexico City internet gateway 442, Paris internet gateway 443, routing server 444, and Houston call center 472. Telephones 461 and 462 are connected to the Mexico City internet gateway 442. Telephones 463 and 464 are connected to the Paris internet gateway 443. Tokyo call center 471 is connected to the Tokyo internet gateway 441. The call centers 471 and 472 comprise a service operation 470.

The internet gateways 441–443, the routing server 444, the internet 450, the telephones 461–464, and the corresponding connections are similar to that described above. Many other internet gateways and telephones could be included on FIG. 4, but the number has been restricted for clarity.

The call centers 471 and 472 of service operation 470 each receive and process large volumes of calls. The call centers 471 and 472 are typically used for specialized call processing, such as product order operations, calling card systems, reservation systems, and customer service. The Tokyo call center 471 is connected to the Tokyo internet gateway 441 over a high-capacity call connection, such as a Synchronous Optical Network OC-3. The Houston call center 472 includes internet gateway functionality and is connected to the internet 450.

The routing server 444 receives queries over the internet 450 that request internet addresses based on routing information, such as a telephone number. The routing server 444 process the queries to select internet addresses for the calls. Call processing may be based on a program specified by the service operation 470 to intelligently route calls to its call enters 471 and 472. The routing server 444 responds to the queries with the selected internet addresses. The routing server 444 could be a conventional internet server/database system configured with software to operate in accord with the following description. Some sample calls are discussed below to illustrate this example of the invention.

The first sample call is from the telephone 461 to the service operation 470. The telephone 461 places the call to the Mexico City internet gateway 442 over the local telephone network in Mexico City. The Mexico City internet gateway 442 answers the call and collects the destination telephone number for the call. The Mexico City internet gateway 442 generates a query that is addressed to the routing server 444 and that contains the destination telephone number. The Mexico City internet gateway 442 transfers the query to the internet 450. The routing server 444 receives the query and processes the destination telephone number to select an internet address. Processing entails entering a look-up table based on the destination number. The look-up table is specified by the service operation 470 to route calls to is call centers based on many factors, such as the identity of the service operator 470, caller number, location of the caller, time of day, day of the week, day of the year, total calls per time period, available call-handling resources, least cost, Nth caller (for example, every $100^{th}$ caller), percent allocation of calls, query/response with a service operation 470 computer, access codes, or other information in the routing server 444 or sent in the query.

For this call, the routing server 444 selects the Houston call center 472 where Spanish speaking service attendants are available. The routing server 444 returns the internet address of the Houston call center 472 to the Mexico City internet gateway 442. The Mexico City internet gateway 442 receives communications from the telephone 461. The Mexico City internet gateway 442 transfers internet packets to the internet 450 that are addressed to the Houston call center 472. The internet packets contain the communications. The Houston call center 472 receives the packets from the internet 320 and processes the call. In this sample call, processing might entail a session with a service attendant to discuss a problem with a computer recently purchased from the service operation 470 by the Mexico City caller.

The second sample call is from the telephone 461 to the telephone 464 through the service operation 470. The telephone 461 places the call to the Mexico City internet gateway 442 over the local telephone network in Mexico City. The Mexico City internet gateway 442 answers the call and collects the destination telephone number for the call. The Mexico City internet gateway 442 generates a query that is addressed to the routing server 444 and that contains the destination telephone number. The Mexico City internet gateway 442 transfers the query to the internet 450. The routing server 444 receives the query and processes the destination telephone number to select an internet address. Processing entails entering a look-up table based on the destination number. The look-up table is specified by the service operation 470 to route calls to one of the call centers 470 and 471 based on many factors. For this sample call, the routing server 444 selects the Tokyo call center 471 because a power outage has affected the Houston call center 472. The routing server 444 returns the internet address of the Tokyo internet gateway 441 to the Mexico City internet gateway 442. The Mexico City internet gateway 442 transfers packets to the internet 450 that contain communications from the telephone 461 and that are addressed to the Tokyo internet gateway 441. The Tokyo internet gateway 441 transfers the communications to the Tokyo call center 471 where the call is processed. In this sample call, processing entails the collection of a code from the caller. The code is typically checked for access to services, such as prepaid or credit card calling. The call center 471 collects a destination telephone number using a reciprocal connection to the telephone 461. The call center 471 forwards the call back to the Tokyo internet gateway 441 along with the destination telephone number. The Tokyo internet gateway 441 queries the routing server 444 with the destination telephone number, and since the destination is Paris, the routing server 444 selects and responds with the internet address of the Paris internet gateway 443. The Tokyo internet gateway 441 transfers internet packets to the internet 450 that are addressed to the Paris internet gateway 443. The internet packets contain the destination telephone number and communications from the telephone 461. The Paris internet gateway 443 receives the packets from the internet 450. The Paris internet gateway 443 places a local telephone call to the telephone 464 using the destination telephone number and transmits the communications from the packets over the call. Reciprocal communications could flow from the telephone 464 to the telephone 461 in a similar manner.

FIG. 5 depicts a look-up table representing the logic deployed in one example of the routing system. Those skilled in the art will recognize many ways to configure and process such tables in support of the invention. The table entries are simplified variables for conciseness, and the actual entries will be apparent to those skilled in the art given the context of the invention. Those skilled in the art are also aware of conventional table look-up techniques, such as the use of ranges and nodes, that are often employed in such tables.

The table is entered using the destination telephone number provided by the internet gateway. Typically, the number will represent a service provided by a service operation. One example is customer service for a particular corporation. When the destination number is matched, the adjacent caller number is analyzed. The asterisk represents a wildcard where any number matches. When the caller number is matched, the adjacent entries for Time-Of-Day (TOD) and percent (%) allocation are analyzed. These entries are used in the conventional manner to route calls based on the time of the call or the weighted distribution of calls among destinations. When these fields are matched, two adjacent prioritized internet addresses are identified. Thus, by matriculating through the table, the routing system is able to select a primary internet address for the call and a back-up internet address if the primary selection fails.

If desired, the service operation can dynamically alter the table to control routing. For example, if one call center is not functional due to a weather event, the IP address for the site can be de-selected by moving its percent allocation to zero. Typically, dynamic control is exerted over a remote data link between the service operation an the routing system.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of operating a routing server to facilitate telephone communications over an internet to a service operation comprised of a first call center and a second call center, the method comprising:

receiving a first query from an internet gateway for a first telephone call to a telephone number;

processing the telephone number from the first query based on a routing table to select a first internet address for the first call center;

generating a first response indicating the first internet address;

transferring the first response to the internet gateway, wherein the internet gateway transfers the first telephone call over the internet to the first call center using the first internet address in response to the first response;

receiving, routing instructions from the service operation, and in response, dynamically altering the routing table based on the routing instructions;

after altering the routing table, receiving a second query from the internet gateway for a second telephone call to the telephone number;

processing the telephone number from the second query based on the altered routing table to select a second internet address for the second call center;

generating a second response indicating, the second internet address; and transferring the second response to the internet gateway, wherein the internet gateway transfers the second telephone call over the internet to the second call center using the second internet address in response to the second response.

2. The method of claim 1 further comprising processing the telephone number to select a backup internet address for the first internet address and generating the first response to indicate the backup internet address.

3. The method of claim 1 further comprising processing the telephone number to select the first internet address based on a spoken language available at the first call center.

4. The method of claim 1 wherein the routing server receives the first and second queries over the internet and transfers the first and second responses over the internet.

5. The method of claim 1 wherein the service operation operates at least one of a: product ordering system, calling card system, reservation system, and customer service system.

6. A method of operating a routing server to facilitate telephone communications over an internet to a service operation comprised of a first call center and a second call center, the method comprising:

receiving a first query from an internet gateway for a first telephone call to a telephone number;

processing the telephone number from the first query to generate and transfer a second query to the service operation;

receiving a first response to the second query from the service operation indicating a first internet address for the first call center;

generating a second response indicating the first internet address;

transferring the second response to the internet gateway, wherein the internet gateway transfers the first telephone call over the internet to the first call center using the first internet address in response to the second response;

receiving a third query from the internet gateway for a second telephone call to the telephone number;

processing the telephone number from the third query to generate and transfer a fourth query to the service operation;

receiving a third response to the fourth query from the service operation indicating a second internet address for the second call center;

generating a fourth response indicating the second internet address; and transferring the fourth response to the internet gateway, wherein the internet gateway transfers the second telephone call over the internet to the second call center using the second internet address in response to the fourth response.

7. The method of claim 6 wherein the routing server receives the first and third queries and the first and third responses over the internet, and wherein the routing server transfers the second and the fourth queries and the second and fourth responses over the internet.

8. The method of claim 6 wherein the service operation operates at least one of a: product ordering system, calling card system, reservation system, and customer service system.

9. A method of operating a routing server to facilitate telephone communications over an internet to a call center, the method comprising:

receiving a first query from a first internet gateway for a telephone call to a first telephone number;

processing the first telephone number from the first query to select a first internet address for the call center;

generating a first response indicating the first internet address;

transferring the first response to the first internet gateway, wherein the first internet gateway transfers the telephone call over the internet to the call center using the first internet address in response to the first response;

receiving a second query from the call center for the telephone call;

processing a second telephone number from the second query to select a second internet address for a second internet gateway;

generating a second response indicating the second internet address; and transferring the second response to the call center, wherein the call center transfers the telephone call over the internet to the second internet gateway using the second internet address in response to the second response.

10. The method of claim 9 wherein the routing server receives the first and second queries over the internet and transfers the first and second responses over the internet.

11. The method of claim 9 wherein the service operation operates a calling card system.

* * * * *